United States Patent [19]

Famili et al.

[11] Patent Number: 5,010,153
[45] Date of Patent: Apr. 23, 1991

[54] COPOLYMERS OF VINYL ACETATE AND FLUORINE-CONTAINING ACRYLATE MONOMERS

[75] Inventors: Amir F. Famili, Schnecksville; F. Lennart Marten, Macungie, both of Pa.; Dillip K. Mohanty, Mount Pleasant, Mich.

[73] Assignee: Air Products and Chemicals, Inc., Allentown, Pa.

[21] Appl. No.: 514,484

[22] Filed: Apr. 25, 1990

Related U.S. Application Data

[63] Continuation-in-part of Ser. No. 202,618, Jun. 3, 1988, abandoned, which is a continuation of Ser. No. 68,866, Jul. 1, 1987, abandoned.

[51] Int. Cl.$^5$ .................. C08F 12/30; C08F 20/22
[52] U.S. Cl. ................... 526/243; 526/245; 526/246
[58] Field of Search ............ 526/243, 245, 246

[56] References Cited

U.S. PATENT DOCUMENTS

| | | | |
|---|---|---|---|
| 4,644,043 | 2/1987 | Ohmori et al. | 526/246 |
| 4,667,000 | 5/1987 | Ohmori et al. | 526/247 |
| 4,687,821 | 8/1987 | Ezzell et al. | 526/247 |

Primary Examiner—Joseph L. Schofer
Assistant Examiner—N. Sarofim
Attorney, Agent, or Firm—Michael Leach; James C. Simmons; William F. Marsh

[57] ABSTRACT

A vinyl acetate copolymer comprising the following general structure:

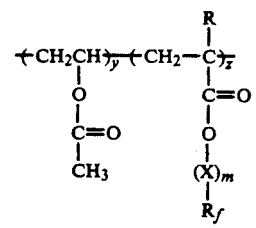

wherein
R is hydrogen or methyl
X is an organic linking group such as

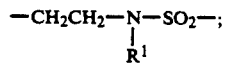

$R^1$ is $C_1$-$C_4$ alkyl;
$R_f$ is a perfluorinated alkyl or poly(alkyleneoxy) group;
m is 0 or 1;
y is 50–99.999 mole %; and
z is 0.001–50 mole %.

The vinyl acetate copolymer is hydrolyzed to provide a vinyl alcohol copolymer that has excellent solvent barrier properties.

17 Claims, No Drawings

COPOLYMERS OF VINYL ACETATE AND FLUORINE-CONTAINING ACRYLATE MONOMERS

CROSSREFERENCE TO RELATED APPLICATIONS

The present application is a continuation-in-part of application Ser. No. 07/202,618 filed Jun. 3, 1988 now abandoned which is a continuation of application Ser. No. 07/068,866 filed Jul. 1, 1987 now abandoned.

TECHNICAL FIELD

The present invention relates to vinyl acetate polymers and, more particularly, the invention relates to copolymers of vinyl acetate with an acrylate monomer containing fluorine.

BACKGROUND OF THE INVENTION

It is well known that fluorocarbons impart surface activity such as water and oil repellency, soil and chemical resistance when applied to a substrate. These unique properties of fluorocarbons which are related to their olephilic and hydrophobic character have drawn considerable attention because a significant effect is produced even when used in low amounts. However, due to the high cost of the fluorocarbons the commercial application has either been limited or the fluorine functionality has been incorporated into polymers.

On the other hand, polyvinyl alcohol is a high surface energy, hydrophilic polymer with excellent physical and mechanical properties. It has been used in such areas as adhesives, emulsions, textiles and in solvent barrier coatings. However, being a water soluble polymer, polyvinyl alcohol has poor water repellency, no oil repellancy and no soil resistance.

Therefore attempts have been made to improve the above properties of polyvinyl alcohol by introducing fluorine functionality onto the backbone to produce a copolymer with low surface energy and improved water and oil repellency.

U.S. Pat. No. 4,574,139 discloses a vinyl ester polymer having a fluorine-containing end group which is produced by polymerizing vinyl ester in the presence of a fluorine-containing thiol. The corresponding vinyl alcohol polymer having a fluorine-containing end group is produced by saponification of the vinyl ester polymer.

U.S. Pat. No. 4,557,955 discloses films and tubular structures which are selectively permeable to liquids and gases and are based on a copolymer composed of copolymerized fluorinated olefin, copolymerized vinyl acetate and, optionally, a copolymerized olefin. At least 50% of the acetate groups of the copolymer may be saponified to form OH groups.

DE 3,415,975 discloses polymers useful as emulsifiers, adhesives and photosensitive layers prepared by polymerizing vinyl esters, fluorine-containing vinyl compounds and, optionally, unsaturated carboxylic acids and/or other comonomers, and optionally saponification of the copolymers.

SUMMARY OF THE INVENTION

The present invention provides a class of vinyl acetate copolymers having the following general formula I:

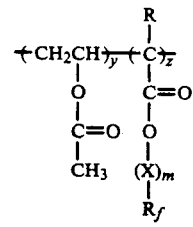

where
R is hydrogen or methyl;
X is an organic linking group;
$R_f$ is a perfluoroalkyl or perfluoro poly(alkyleneoxy) group;
m is 0 or 1;
y is 50–99.999 mole %; and
z is 0.001–50 mole %.

The vinyl acetate copolymers of general formula I are hydrolyzed to the vinyl alcohol copolymers of the following general formula II:

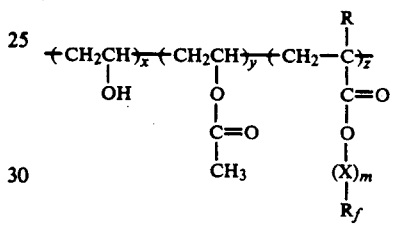

where R, X, $R_f$, m and z are as defined above and x is 50–99.9 mole % and y is 0–50 mole %.

A process that can be used for preparing the copolymers in a reaction vessel comprises (a) continuously feeding vinyl acetate monomer and a fluorine-containing acrylate monomer to a reaction mixture, (b) polymerizing the vinyl acetate and fluorine-containing acrylate monomer to yield a copolymer in the reaction mixture.

(c) continuously withdrawing reaction mixture containing the copolymer, and (d) hydrolyzing the acetate functionality of the copolymer to yield a vinyl alcohol copolymer.

Desirably, steps (a)–(c) are performed in such a manner as to attain a steady state condition in the reaction vessel.

The copolymers of the invention are easy to prepare in existing polyvinyl alcohol production equipment and offer a polymer having good thermoplastic and thermal stability properties and excellent solvent resistance. The vinyl alcohol copolymers for the most part retain the water solubility and strength of the polyvinyl alcohol and have an added flexibility.

It is believed that the fluorine-containing side chains form a surface layer rich in fluorine thus yielding excellent solvent resistance.

DETAILED DESCRIPTION OF THE INVENTION

The invention provides, in the end, a modified polyvinyl alcohol composition comprising a copolymer of vinyl alcohol, vinyl acetate and a fluorine-containing acrylate (F-acrylate) comonomer of general formula III.

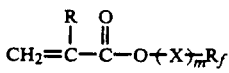

where
R represents H or CH$_3$; preferably CH$_3$;
X represents an organic linking group;
R$_f$ is a perfluorinated alkyl or perfluorinated poly(alkyleneoxy) group; and
m is 0 or 1.

The comonomers of formula III are fluorine-containing ester derivatives of an acrylic acid, namely acrylic acid or methacrylic acid. These acrylate ester comonomers may contain an organic linking group X which functions to connect the fluorine-containing group R$_f$ with the polymer backbone via the ester functionality. The preferred X group is

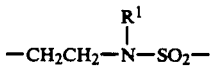

where R$^1$ is a C$_1$-C$_4$ alkyl group such as methyl, ethyl, isopropyl, isobutyl and the like, but X may also be a lower (C$_1$-C$_4$) alkylene group such as methylene, ethylene, propylene and the like. X may also be a lower alkyl ether or alkylthio ether group.

Contemplated as the functional, or operative, equivalent of the F-(meth)acrylate ester monomers for purposes of this invention are F-(meth)acrylamide monomers in which the nitrogen atom of the amide moiety is bonded to —(X)$_m$—R$_f$.

The R$_f$ moiety may be a perfluoroalkyl group containing 2 to 20 carbon atoms examples of which may be represented by R$^2$—(CF$_2$)$_n$— and (CF$_3$)$_2$CR$^2$—(CF$_2$)$_p$— where R$^2$ is F and n is 2 to 20. preferably 2 to 10, and p is 0 to 17. When R$_f$ is a perfluoro poly(ethyleneoxy) or poly(propyleneoxy) group, suitable illustrative groups are represented by

where n is 1 to 10. preferably 1 to 5. R$^3$ represents H, C$_1$-C$_{20}$ alkyl or perfluoroalkyl, C$_6$-C$_{20}$ aryl or perfluoroaryl, or C$_7$-C$_{30}$ alkylaryl or perfluoroalkylaryl and R$^4$ represents F or —CF$_3$. Thus the perfluorinated poly(alkyleneoxy) acrylate monomers can terminate in a free hydroxyl group or be end-capped with a C$_1$-C$_{20}$ alkyl group such as methyl, ethyl, butyl, octyl, dodecyl and the like; a C$_6$-C$_{20}$ aryl group such as phenyl, naphthyl and the like., or a C$_7$-C$_{30}$ alkylaryl group such as tolyl, methylnaphthyl, nonylphenyl, and the like, which end-cap groups may be perfluorinated. It is preferred that R$^3$ be hydrogen.

When R$^4$ is trifluoromethyl, i.e. when the acrylate monomer contains perfluorinated propyleneoxy units, it is possible that the trifluoromethyl group could be on the adjacent carbon atom depending upon the synthesis route used to prepare the F-acrylate comonomer.

It is preferred to use the methacrylate esters, i.e. R is CH$_3$, because of their superior stability under alcoholysis conditions.

Many of the F-(meth)acrylate comonomers are commercially available from E. I. DuPont de Nemours & Co. and the 3M Company or can be prepared according to the teachings in U.S. Pat. No. 3.282,905, EP 190,993A., and EP 158,854A. The comonomers can also be prepared with blocks of ethyleneoxy units and propyleneoxy units some of which are perfluorinated and some of which are not, or mixtures thereof.

The polymers of the invention can be prepared by a free radical process using a train of continuous stirred tank reactors followed by a hydrolysis, or alcoholysis, reaction. Vinyl acetate, F-acrylate comonomer, free radical catalyst and methanol are added continuously to the first reactor. The F-acrylate comonomer can be added to subsequent reactors in order to maintain a homogeneous copolymer.

Unreacted vinyl acetate is removed from the exit stream by contacting it with methanol vapors in a stripping column yielding an intermediate vinyl acetate substantially homogeneous random copolymer having the general formula I.

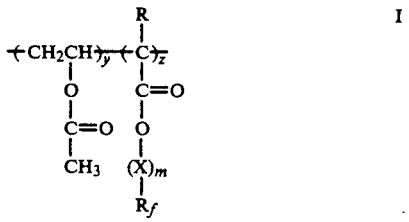

where
R is hydrogen or methyl;
X is an organic linking group;
R$_f$ is perfluoroalkyl or perfluoropoly (alkyleneoxy);
m is 0 or 1;
y is 50–99.999 mole %; and
z is 0.001–50 mole %.

The alcoholysis of this intermediate vinyl acetate copolymer is effected by the addition of a base catalyst. The resulting product is washed with methanol and dried to yield the vinyl alcohol/F-acrylate copolymer of formula II

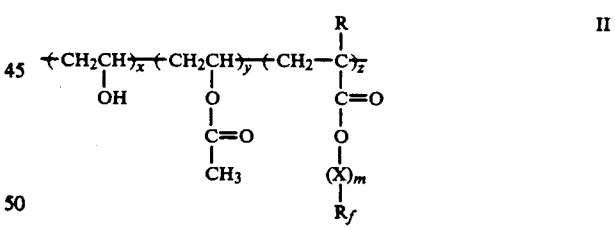

where R, X, R$_f$, m, and z are as defined above and x is 50–99.9 mole % and y is 0–50 mole %.

In the preferred embodiment of the vinyl acetate copolymers of the invention, y ranges from 85–99.995 mole %, and z ranges from 0.005–15 mole %. In the most preferred embodiment, y is 90–99.995 mole % and z is 0.005–10 mole %.

In the preferred embodiment of the vinyl alcohol copolymers of the invention, x ranges from 75–99.5 mole %, y ranges from 0–25 mole % and z ranges from 0.005–15 mole %. In the most preferred embodiment, x is from 85–99 mole %, y is from 0–15 mole % and z is from 0.005–10 mole %.

The degree of polymerization of the copolymers of this invention can range from about 100 up to 3,000, but is preferably 200 to 2000.

The vinyl acetate/F-acrylate and vinyl alcohol/F-acrylate copolymers of the present invention can be prepared by the following process:

The vinyl acetate/F-acrylate copolymers are prepared by the use of a train of continuous stirred tank reactors. The vinyl acetate and F-acrylate are fed to the first reaction vessel in which the mixture is purged with an inert gas such as nitrogen. A free radical initiator solution, for example t-butyl peroxypivalate dissolved in methanol, is combined with the above streams which are passed directly and continuously into the first reactor from which a stream of the polymerization mixture is continuously withdrawn.

The polymerization reaction mixture exiting the first reactor can be added to a second reactor together with additional initiator and additional F-acrylate in order to further increase the conversion of the initially added vinyl acetate.

Contemplated as the functional equivalent of vinyl acetate for purposes of this invention are the vinyl esters of formic acid and $C_3$–$C_{12}$ alkanoic acids.

Oxygen should, of course, be excluded during the polymerization. Such exclusion of oxygen is effectively achieved by employing a continuous polymerizer provided with a reflux condenser. Thus, when the polymerization reaction is performed continuously under reflux conditions, the polymerizer in effect becomes a system closed from the atmosphere.

The polymerization of the vinyl acetate and F-acrylate may be accomplished at temperatures ranging from 45°–130° C., the preferred temperature range being 55°–85° C. This temperature range will result in operating pressures in the range of 1–10 atm. Since the polymerization reaction is exothermic, the reaction is effected under reflux and/or with the aid of cooling means such as the cooling jacket for the polymerization reactor in order to control the temperature at the desired level.

The polymerization is normally performed in nonaqueous solutions. i.e. less than about 1 wt % water. The vinyl acetate stream and the F-acrylate stream can be diluted using $C_1$–$C_4$ aliphatic alcohols or other solvents such as the alkanoic esters of such alcohols which are inert to the polymerization initiator. Examples of suitable solvents are methyl acetate, ethyl acetate and the like with the preferred solvents being ethanol, propanol, butanol and especially methanol A pure stream of any of the above solvents can be added continuously to the reactor.

Unpolymerized vinyl acetate is removed from the vinyl acetate/F-acrylate copolymer solution effluent from the last polymerization vessel in a stripping column in which methanol vapor is employed as the stripping agent. An inhibitor such as hydrazine, hydroquinone, sulfur or quinone or the like can be added to the effluent stream prior to the stripping column. The purpose of the inhibitor is to prevent polymerization from occurring in the stripping column. The overhead fraction from the stripping column comprising unpolymerized vinyl acetate and methanol may be passed to a recovery system or, preferably, recycled to the polymerization process.

The bottom effluent from the stripping column comprises a solution of substantially homogeneous, random vinyl acetate/F-acrylate copolymer in methanol. This solution is passed directly to an alcoholysis system, particularly when the hydrolytic alcohol to be employed in the alcoholysis is methanol as will usually be the case.

The residence time in the polymerization reaction vessels, the monomer feed rate, the solvent concentrations, the initiator concentration and the polymerization temperature will generally be such that the monomer concentration in the polymerization reaction vessels will range from 2–85 wt %. As is well known to those skilled in the art, these variables will generally be controlled in accordance with the desired molecular weight of the vinyl acetate/F-acrylate copolymer intermediate which will comprise a substantially homogeneous, random distribution of vinyl acetate and F-acrylate units along the copolymer backbone.

Any free radical initiator which is soluble in the reaction mixture and possesses the desired half-life at the temperatures to be used may be employed in effecting the polymerization. Suitable initiators would include organic peroxides such as t-butyl peroxypivalate, di(2-ethyl hexyl) peroxydicarbonate, t-butyl peroxyneodecanoate and 2-2'-azobisisobutyronitrile. The concentration of the initiator in the polymerization reaction mixture will normally range from 0.0001–2 wt %, the preferred concentration being 0.001–0.5 wt %.

A small amount of an acid may be added to the vinyl acetate stream prior to the first reaction vessel in order to limit the transesterification reaction between vinyl acetate and the added alcohol solvent. This reaction results in the formation of acetaldehyde which, besides being a chain transfer agent, is detrimental to the final product color. Examples of suitable acids include phosphorous acid, oxalic acid, citric acid, tartaric acid, with the preferred acids being phosphorous and tartaric acids. The concentration of such acids in the polymerization reaction mixture would typically range from 2–50 ppm with the preferred range being 5–25 ppm.

In general, it is preferred that the amount of F-acrylate combined with the vinyl acetate monomer to produce the copolymer be limited so as to yield the hydrolyzed copolymer containing about 2–50 wt % of the F-acrylate, i.e. about 0.1–8 mole %.

The above described continuous polymerization procedure will afford a substantially homogeneous, random copolymer product as opposed to the product from a batch reaction process which is highly dependent upon the reactivity ratios of the monomers, the F-acrylate monomers being more reactive than the vinyl acetate. Thus a batch process would yield a polymer having an initial section rich in F-acrylate units (little vinyl acetate) and the opposite end essentially vinyl acetate units.

A semi-continuous, or delay addition, process could also be used to make the copolymers.

The alcoholysis of the intermediate vinyl acetate/F-acrylate may be accomplished by any of the well-known procedures for the catalyzed alcoholysis of vinyl ester polymers. However, to prepare the copolymer products of the invention which are essentially free of acid and in which only the acyloxy portion of the vinyl acetate component is replaced wholly or partially by hydroxyl groups, basic alcoholysis should be employed. Although the method for preparing the vinyl acetate/F-acrylate copolymer intermediate under continuous polymerization conditions is preferred, the alcoholysis of such intermediate may be either batch or continuous process.

The patent literature describes various batch and continuous methods for the production of polyvinyl alcohols by the catalytic alcoholysis of polyvinyl esters.

These methods are well applicable to the vinyl acetate/F-acrylate copolymers of the invention and include the batch method of U.S. Pat. No. 2,227,997.

The continuous method in U.S. Pat. No. 2,642,419 in which the reactants are continuously mixed, the reaction mixture is poured or cast onto a moving surface, e.g. the belt or conveyor where gelling occurs, and the gel is removed from the surface before syneresis occurs. Once removed from the belt, the product is cut into smaller particles, washed with methanol and dried. The continuous method in U.S. Pat. No. 2,734,048 employing a slurry type of alcoholysis may also be practiced in carrying out the alcoholysis step for the present invention. Since the methods of all the foregoing patents are well known, details thereof are incorporated by reference.

In general, ethanol or preferably methanol is used in the alcoholysis reaction at temperatures ranging from 20-100° C, but most desirably 35°-65° C. The pressure is that which is sufficient to maintain liquid phase conditions.

The hydrolytic alcohol should be substantially anhydrous in that it o does not contain more than 2 wt % and preferably not more than 0.2 wt % water. The alcohol content of the hydrolysis mixture should be such as to provide a suitable excess of the alcohol. Advantageously the alcohol used will be the same alcohol that was utilized for dissolving the vinyl ester in the production of the copolymer intermediate. The alcohol would generally constitute from about 30-90 wt %, preferably 35-75 wt %, of the alcoholysis reaction medium. Conversely the solids content will generally be 10-70 wt %, preferably 25-65 wt % of the reaction mixture.

The by-product of the alcoholysis reaction will be the acetate ester of the hydrolytic alcohol. Such ester can be removed as it is formed during the alcoholysis or allowed to build up in the alcoholysis medium.

The alcoholysis catalyst can be any of the alkaline catalysts that are typically used, such as the alkali metal hydroxides and the alkali metal alcoholates. The alkali metal hydroxides, particularly sodium hydroxide, are especially preferred. The catalyst concentration in the alcoholysis mixture may range from about 0.05-10 wt % on polymer, but preferably 0.2-4 wt % on polymer.

The vinyl alcohol/vinyl acetate/F-acrylate copolymer product of this invention can be processed thermoplastically without any difficulty, for example, by molding, injection molding and extrusion. The copolymers are suitable for the preparation of solvent resistance containers.

The following examples were conducted at atmospheric pressure using two 2 liter reaction vessels in series. The reaction vessels were equipped with a mechanical agitator, a condenser, nitrogen inlet and a feed control system. The monomer/comonomer mixture (feed I), the solvent/initiator mixture {feed II}, and the tartaric acid/solvent solution (feed III) were placed in different feed tanks and fed to the first reactor at a fixed rate through a metering pump while comonomer (feed IV) was fed to the second reactor. The desired number average and weight average molecular weights were achieved by controlling residence time, methanol to vinyl acetate (VAC) ratio and initiator concentration as is well known in the art. The exit stream from the second reactor was passed down through a column filled with Raschig rings while methanol vapor was introduced in a countercurrent manner to remove any unreacted vinyl acetate which is condensed overhead. The stripping rate was conducted in a manner which reduced the vinyl acetate concentration in the intermediate copolymer solution to less than 0.07 wt %.

The alcoholysis was performed by feeding the copolymer solution and a 5 wt% sodium hydroxide solution in methanol through an in-line mixer and cast onto a belt where gelling occurred. The gel was removed from the belt, when the desired conversion was reached. Then it was cut into smaller particles, shortstopped with acetic acid, and washed with methanol.

The invention will be further illustrated by the following examples in which parts and percentages are by weight and feeds are in g/hr unless otherwise indicated.

EXAMPLE I

The ingredients shown in Table I were charged to the above-described polymerization system using the described feeds:

TABLE I

| | VAC | Zonyl TM* | Initiator* | MeOH | Tartaric Acid |
|---|---|---|---|---|---|
| Initial Charge Reactor 1 (g) | 462 | 6.75 | 1.24 | 1001 | 0.02 |
| Initial Charge Reactor 2 (g) | 248 | 2.25 | 1.25 | 1084 | 0.02 |
| Feed I (g/hr) | 415 | 6.75 | — | — | — |
| Feed II (g/hr) | — | — | 3.0 | 150 | — |
| Feed III (g/hr) | — | — | — | 107 | 0.012 |
| Feed IV (g/hr) | 20 | 2.25 | — | — | — |

*$CH_2=C(CH_3)CO_2-CH_2CH_2-C_8F_{17}$ marketed by E. I. DuPont de Nemours & Co.
**t-Butyl Peroxyneodecanoate The mixture in the reactors was purged with nitrogen and brought to reflux by circulating hot water through the reactor vessel jackets. After one hour the feeds were pumped into the respective reactors at a fixed rate until a steady state condition in the system was reached in about 5 hours. The second reactor vessel effluent was introduced into the stripping operation at this point.

The stripped paste (32% solid) and 5.0% solution of NaOH in methanol were fed to a mixer using flow rates of 527 g/min. and 23 g/min. respectively. The slab collected from the mixer was kept at 44° C. for 12.5 minutes, whereupon it was cut into small particles and added to a 0.5 wt % acetic acid/methanol solution, washed with methanol and dried. The properties of the alcoholysis product are described in Table III.

EXAMPLE II

This copolymerization was carried out in the same manner described in Example I except that the feeds (no Feed III) charged to the reaction vessels were as shown in Table II.

TABLE II

| | VAC | FX-14* | Initiator** | MeOH | Tartaric Acid |
|---|---|---|---|---|---|
| Initial Charge Reactor 1 (g) | 1002 | 6 | 0.025 | 339 | 0.02 |
| Initial Charge Reactor 2 (g) | 887 | 2 | 0.025 | 613 | 0.02 |
| Feed I (g/hr) | 480 | 6 | — | — | — |
| Feed II (g/hr) | — | — | 0.035 | 95.4 | 0.012 |
| Feed IV (g/hr) | 20 | 2 | — | — | — |

*$CH_2=C(CH_3)CO_2-CH_2CH_2-N(C_2H_5)-SO_2-C_8F_{17}$ *marketed by the 3M Company.*
**t-Butyl Peroxyneodecanoate The stripped paste {16.8% solid) and 4.7% solution of NaOH in methanol were fed to a mixer using flow rates of 514 g/min. and 25.6 g/min. respectively. The slab collected from the mixer was kept at 44° C. for 12.5 minutes, whereupon it was cut into small particles and added to a 0.5 wt % acetic acid/methanol solution, washed with methanol and dried. The properties of the alcoholysis product are described in Table III.

TABLE III

| Co-polymer | Degree of Polymerization | mole % PVOH | mole % Comonomer | Surface Tension (dynes/cm) |
| --- | --- | --- | --- | --- |
| V-107[a] | 600 | 98.5 | 0 | 65 |
| V-165[b] | 2200 | 99.3 | 0 | 65 |
| I | 600 | 99.65 | 0.35 | 52 |
| II | 2200 | 99.64 | 0.36 | 52 |

[a]Vinol 107 PVOH is a 98–98.8% hydrolyzed PVOH marketed by Air Products and Chemicals, Inc.
[b]Vinol 165 PVOH is a 99.3+% hydrolyzed PVOH marketed by Air Products and Chemicals, Inc.

EXAMPLE III

This copolymerization is carried out in the same manner as described in Example I except that instead of Zonyl TM monomer, the perfluoro poly(ethyleneoxy) methacrylate $[CH_2=C(CH_3)CO_2CF_2CF_2O)_nR^3]$ where n is 3–5, available from Daikin Ind. Ltd., is used as the comonomer. The stripped paste and a 5% solution of NaOH in methanol are fed to a mixer. The slab collected from the mixer is kept at 44° C. for 12.5 minutes, whereupon it is cut into small particles and added to a 0.5 wt % acetic acid/methanol solution, washed with methanol and dried.

EXAMPLE IV

The inner layers of high density polyethylene bottles (500 cc) were coated with a 10 wt % aqueous solution of a vinyl alcohol copolymer like that of Example II and dried in an oven at 70° C. for 24 hr. The solvent barrier properties of the coated bottles were measured by placing 450 g of polar and nonpolar solvents in the sealed bottles and measuring the weight loss of the bottles after three weeks at 50° C. for solvents A-C and room temperature for solvents D and E. The results are shown in Table IV.

TABLE IV

| | Wt % Loss (g) | | |
| --- | --- | --- | --- |
| Solvent | HDPE | HDPE/ Ex II | HDPE/ V-107 |
| A Paint Remover | 9 | 2.64 | 5.6 |
| B Lacquer Thinner | 12.55 | 0.54 | — |
| C Toluene/Hexanes/Methanol 50/35/15 | 28.5 | 3.19 | 29 |
| D Tetrahydrofuran | 1.7 | 0.28 | — |
| E Methylene Chloride | 2.67 | 1.33 | 2 |

The above results clearly demonstrate the superior solvent barrier properties of fluorine-containing polyvinyl alcohol toward polar and nonpolar solvents.

STATEMENT OF INDUSTRIAL APPLICATION

The invention provides a vinyl acetate/F-acrylate copolymer which can be hydrolyzed to the vinyl alcohol copolymer. The vinyl alcohol copolymer can be thermoplastically processed by molding, injection molding and melt extrusion into shaped articles possessing good solvent barrier properties.

We claim:

1. A vinyl acetate copolymer comprising the following general structure:

$$\text{+CH}_2\text{CH+}_y\text{+CH}_2\text{−C+}_z$$
with side groups: O−C(=O)−CH$_3$ and C(=O)−O−(X)$_m$−R$_f$, with R on the quaternary carbon wherein R is hydrogen or methyl;
X is $$-CH_2CH_2-(N(R^1)-SO_2)_n-$$

wherein $R^1$ is a $C_1$-$C_4$ alkyl group and n is 0 or 1;
$R_f$ is a perfluoroalkyl or perfluoro poly(alkyleneoxy) group;
m is 0 or 1;
y is 50–99.999 mole %; and
z is 0.001–50 mole %.

2. The copolymer of claim 1 in which R is methyl.
3. The copolymer of claim 1 in which m is 0.
4. The copolymer of claim 1 in which m is 1.
5. The copolymer of claim 1 in which y is 85–99.995 mole % and z is 0.005–15 mole %.
6. The copolymer of claim 1 in which y is 90–99.995 mole % and z is 0.005–10 mole %.
7. The copolymer of claim 2 in which y is 85–99.995 mole % and z is 0.005–15 mole %.
8. The copolymer of claim 2 in which y is 90–99.995 mole % and z is 0.005–10 mole %.
9. The copolymer of claim 4 in which n is 0.
10. The copolymer of claim 4 in which n is 1.
11. A vinyl acetate copolymer consisting essentially of the following general formula $$\text{+CH}_2\text{CH+}_y\text{+CH}_2\text{−C(CH}_3\text{)+}_z$$
with side groups: O−C(=O)−CH$_3$ and C(=O)−O−CH$_2$−CH$_2$−N(R$^1$)−SO$_2$−R$_f$ wherein
$R^1$ is $C_1$-$C_4$ alkyl;
$R_f$ is F$(CF_2)_n$ or $(CF_3)_2$−CF$(CF_2)_p$ and n is 2 to 20 and p is 0 to 17;
m is 0 or 1;
y is 85–99.995 mole %; and
z is 0.005–15 mole %.

12. The copolymer of claim 11 in which $R^1$ is ethyl.
13. The copolymer of claim 11 in which m is 0.
14. The copolymer of claim 11 in which m is 1.
15. The copolymer of claim 13 in which $R_f$ is −$C_8F_{17}$.
16. The copolymer of claim 14 in which $R_f$ is −$C_8F_{17}$.
17. The copolymer of claim 11 in which y is 90–99.995 mole % and z is 0.005–10 mole %.

* * * * *